US010897432B2

(12) United States Patent
Estrada et al.

(10) Patent No.: US 10,897,432 B2
(45) Date of Patent: Jan. 19, 2021

(54) CHAT-ENABLED MESSAGING

(71) Applicant: Microsoft Technology Licensing, LLC, Redmond, WA (US)

(72) Inventors: Julio Estrada, Bellevue, WA (US); Nagalinga Raju Samuthirapandi, Redmond, WA (US); Chowdhury Sucharit Barua, Redmond, WA (US); Vasant Kumar Tiwari, Redmond, WA (US); Lei Yu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 138 days.

(21) Appl. No.: 15/831,293

(22) Filed: Dec. 4, 2017

(65) Prior Publication Data
US 2019/0173811 A1 Jun. 6, 2019

(51) Int. Cl.
G06F 15/173 (2006.01)
H04L 12/58 (2006.01)
G06Q 30/00 (2012.01)
H04W 4/12 (2009.01)
(Continued)

(52) U.S. Cl.
CPC .......... *H04L 51/02* (2013.01); *G06Q 30/016* (2013.01); *H04L 51/046* (2013.01); *H04L 51/18* (2013.01); *H04L 51/36* (2013.01); *H04L 51/38* (2013.01); *H04L 67/2819* (2013.01); *H04W 4/12* (2013.01); *H04L 63/0884* (2013.01)

(58) Field of Classification Search
CPC ....... H04L 51/02; H04L 51/38; H04L 51/046; H04L 51/18; H04L 51/36; H04L 67/2816; H04L 63/0884; G06Q 30/016; H04W 4/12
See application file for complete search history.

(56) References Cited

U.S. PATENT DOCUMENTS

| 7,870,199 | B2 | 1/2011 | Galli et al. |
| 9,552,350 | B2 | 1/2017 | Brown et al. |
| 9,609,132 | B2 | 3/2017 | Tuchman et al. |

(Continued)

OTHER PUBLICATIONS

"Artificial Intelligence for Enterprises", Retrieved from<<https://web.archive.org/web/20170522182322/http:/ira.ai/>>, May 22, 2017, 6 Pages.

(Continued)

*Primary Examiner* — Thanh T Nguyen
(74) *Attorney, Agent, or Firm* — Merchant & Gould P.C.

(57) ABSTRACT

Email has become commonplace as a means to communicate among parties non-synchronously by exchanging email messages. Some communications, however, may be more effective in real-time or in near real-time. For instance, service providers may offer a chat feature to accommodate real-time or near real-time help or service communications with customers. However, in this case, the user is likely required to enter credentials and/or context information to transition into a different communication type with the service provider. The present systems and methods provide a continuous conversation experience for the user whereby a message recipient of one message type (e.g., email, text, etc.) may continue a conversation in a different message type (e.g., a chat session, instant message, etc.) without manually providing message context for communicating via the second message type.

20 Claims, 11 Drawing Sheets

(51) Int. Cl.
*H04L 29/08* (2006.01)
*H04L 29/06* (2006.01)

(56) References Cited

U.S. PATENT DOCUMENTS

| | | |
|---|---|---|
| 9,647,968 B2 | 5/2017 | Smullen et al. |
| 2006/0179114 A1 | 8/2006 | Deeds |
| 2008/0282169 A1* | 11/2008 | Chang .................. G06F 16/954 |
| | | 715/733 |
| 2009/0187831 A1* | 7/2009 | Tiwana .................. H04L 51/36 |
| | | 715/752 |
| 2010/0312836 A1* | 12/2010 | Serr ....................... G06Q 10/00 |
| | | 709/206 |
| 2011/0319056 A1* | 12/2011 | Toy ......................... H04W 4/00 |
| | | 455/412.2 |
| 2014/0280623 A1 | 9/2014 | Duan |
| 2015/0229720 A1 | 8/2015 | Knighton et al. |
| 2017/0242886 A1 | 8/2017 | Jolley et al. |

OTHER PUBLICATIONS

Amruth, "Genie in a Bot: Support over Chat", Retrieved from<<https://blog.freshdesk.com/chatbots-in-support/>>, Nov. 8, 2016, 6 Pages.
Reznik, Yaniv, "Twitter pushes into customer service—can it prove to be successful?", Retrieved from<<https://www.itproportal.com/features/twitter-pushes-into-customer-service-can-it-prove-to-be-successful/>>, May 15, 2017, 8 Pages.
"International Search Report and Written Opinion Issued in PCT Application No. PCT/US2018/061404", dated Feb. 1, 2019, 10 Pages.

* cited by examiner

```
From: Water Utility Billing Service <waterbill@waterutil.example>
To: Kat Larsson <klarsson@example.example.net>
Subject: October Water Invoice
Date: Fri, 10 Nov 2017 22:10:00 -0600
Message-Id: <1234@local.machine.example>
MIME-Version: 1.0
Content-type: multipart/alternative; boundary=-----accesschatbot -----accesschatbot
Content-type: text/plain Hi Kat --
The attached is your October invoice on water utility.
Please feel free to contact our Customer Support if you have any question.
Chat service is provided for your convenience.
Thank you for your business.

- Water Utility Billing Service
-----accesschatbot
Content-type: application/withchatbot
#CustomerId=123456789
#ServiceType=Water
#ChatBotPortal=examplebot@water.util.example
#ChatBotIdenfier=The-Water-Utility-Customer-Support
#ChatBotAuthenticationCode=FA3PR93URMA
#CurrentMonth=10/2017
#ContextTokenId=86817613
#ShowButtonToStartSession=TRUE
```

FIG. 4

CHAT-ENABLED MESSAGING

BACKGROUND

Communication by email has become commonplace both professionally and socially because of the near-ubiquitous use of communication devices and the availability of mobile email applications. Mobile email applications enable the sending and receiving of emails with service providers, colleagues, and friends from virtually anywhere at any time. For instance, service providers such as water, gas, and electric utilities as well as cellular, dish and cable telecommunications companies, often request their customers to "go paperless," enabling such service providers to send monthly invoices electronically via email or other message types (e.g., short message service (SMS)) to respective customers and subscribers. In addition to delivering invoice documents via electronic messages, some of service providers may also provide online customer support services to efficiently accommodate and respond to inquiries and requests from respective customers. The online customer support services may use various communication platforms, including real-time or near real-time communications that are more interactive than email communications. In order to support near real-time communications with customers, some service providers may provide customer support services by instant messages with a customer service representative. Additionally or alternatively, to provide timely, high-volume customer support without requiring a human representative, some service providers may utilize a chat bot service, where received inquiries are interpreted and responded to automatically based on artificial intelligence.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by providing user interaction features enabling a seamless transition between communication using emails hosted by an email service to a chat bot hosted by a chat service. Email has become commonplace as a means to communicate among parties non-synchronously by exchanging email messages. Some communications, however, may be more effective in real-time or in near real-time. For instance, service providers may offer a chat feature to accommodate real-time or near real-time help or service communications with customers. However, in this case, the user is likely required to enter credentials and/or context information to transition into a different communication type with the service provider. The present systems and methods provide a continuous conversation experience for the user whereby a message recipient of one message type (e.g., email, text, etc.) may continue a conversation in a different message type (e.g., a chat session, instant message, etc.) without manually providing message context for communicating via the second message type.

In one aspect, a computer-implemented method for launching a chat session from a message is provided. The method includes receiving a message including an access point to a chat service. The method further includes receiving a selection of the access point from within the message and extracting context data from the message. Based on the extracted context data, the method further includes providing the context data to the chat service, and establishing a conversation with the chat service based on the context data, wherein the conversation with the chat service is a continuation of the message based on the context data.

In another aspect, a computer system is provided. The computer system includes at least one processing unit and at least one memory storing computer-executable instructions for launching a chat session from a message that, when executed by the at least one processing unit, cause the computer system to receive a message including an access point to a chat service. The computer-executable instructions further cause the computer to receive a selection of the access point from within the message. The computer-executable instructions also cause the computer to extract context data from the message. Based on the extracted context data, the computer-executable instructions further cause the computer to provide the context data to the chat service, and establish a conversation with the chat service based on the context data, where the conversation with the chat service is a continuation of the message based on the context data.

In yet another aspect, a computer storage medium is provided. The computer storage medium stores computer-executable instructions that, when executed by at least one processing unit, causes the at least one processing unit to receive a message including an access point to a chat service. The computer storage medium stores computer-executable instruction, when executed by at least one processing unit, further causes the at least one processing unit to receive a selection of the access point from within the message. The computer storage medium stores computer-executable instructions that, when executed by at least one processing unit, further cause the at least one processing unit to extract context data from the message. Based on the extracted context data, the computer storage medium stores computer-executable instructions that, when executed by at least one processing unit, further cause the at least one processing unit to provide the context data to the chat service and establish a conversation with the chat service based on the context data, wherein the conversation with the chat service is a continuation of the message based on the context data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 4 illustrates an example of a message including context data according to an example system.

DETAILED DESCRIPTION

Figure 1:
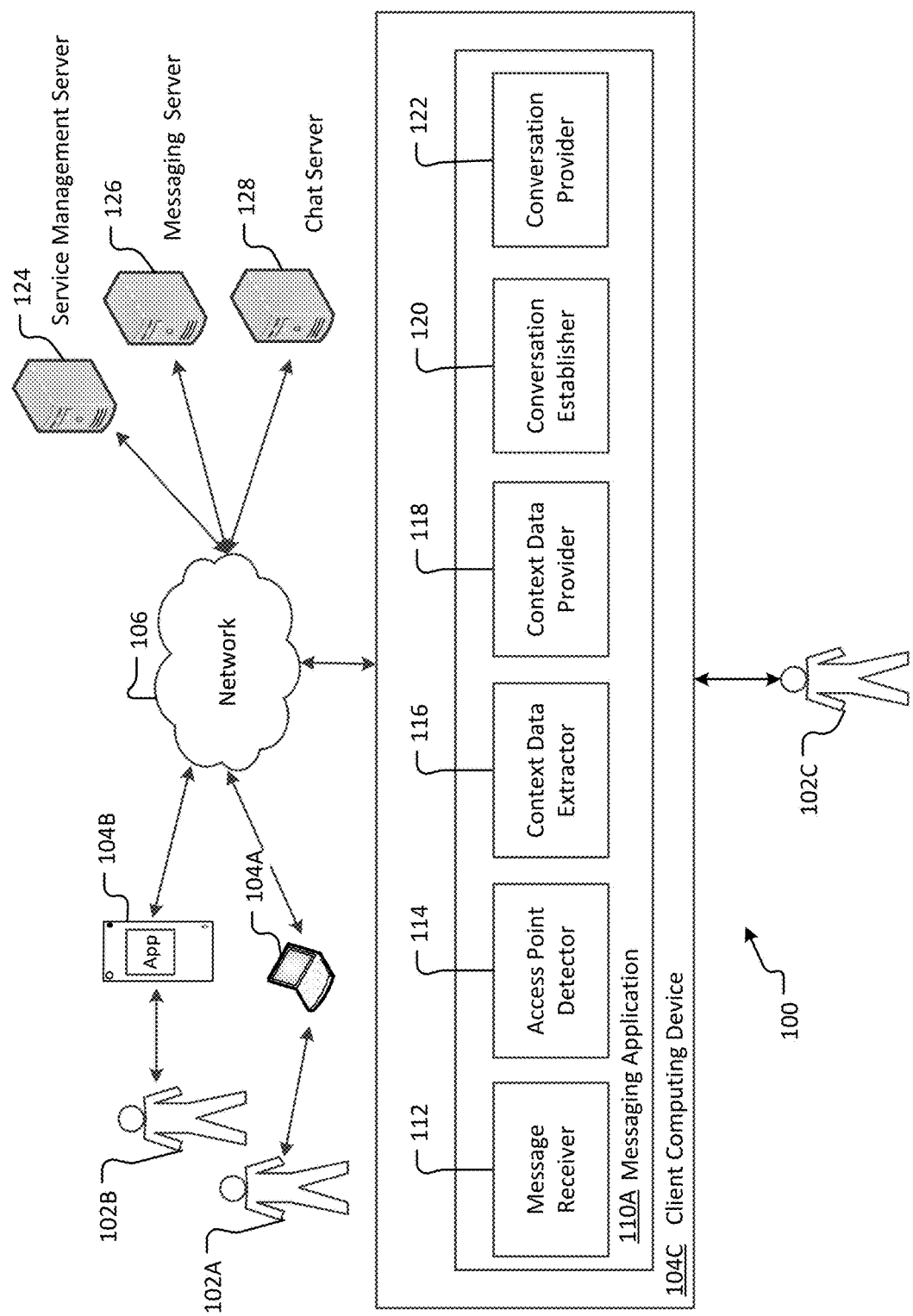
FIG. 1 illustrates an overview of an example system for continuing a conversation from a received message to a chat service.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

As electronic communications with service providers have become more commonplace, customers may be required to use multiple types of applications for communicating with service providers. For instance, customers may receive an invoice via a messaging application such as email or SMS (text), but may be required to log into a customer account to receive real-time or near real-time customer support via an instant messaging or other chat application. That is, after a customer receives a monthly invoice from a service provider via email, the customer may want to communicate with the service provider about the invoice using a method that is more responsive than email, such as instant messaging or chat bot communications. To facilitate customer support, some service providers may provide a link to the customer's account or a link to customer support (e.g., a chat service) within the email that includes the invoice. However, in this case, the user must enter credentials to log into the customer account and/or must enter context information to transition into a different communication type with the entity.

In addition to potentially needing to enter user credentials, the transition to a second communication type may be cumbersome because the context of the email is not passed to the second communication type. That is, while the subject matter of the user's inquiry may be provided in the email (e.g., attached or embedded invoice, inquiry from a vendor, etc.), the user needs to "restart" a conversation with the customer service representative (e.g., via IM) or the chat bot service by reentering information such as an invoice number, invoice amount, vendor query, etc. Not only so, but when the chat bot service is a third-party service, a trust relationship may not exist between the service provider and the chat bot service or between the user and the chat bot service, which complicates the passing of customer information to the chat bot service. As should be appreciated, the term "service provider" may include any entity that interacts with a user via an electronic communication, including banks, credit card companies, investment firms or other financial institutions; utilities; telecommunications companies; vendors; retailers; etc. Additionally, while some examples described herein discuss an email communication providing a link or access point to a chat bot for further communication with the service provider, any first communication type (e.g., email, short message system (SMS), instant message (IM), etc.) may be provided for transitioning into a second communication type (e.g., IM, SMS, chat bot, etc.).

The present disclosure provides systems and methods for chat-enabled messages, which enables seamless transition from use of a first message type (e.g., email, text, etc.) to a second message type (e.g., IM, chat, chat bot, text), without manually reentering context when transitioning from the first message type to the second message type.

FIG. 1 illustrates an overview of an example system for seamlessly transitioning conversation from a received message (e.g., email message) to a chat or other instant messaging platform. System 100 may include one or more client computing devices 104 (e.g., client computing devices 104A, 104B, and 104C) that may execute client versions of email and other messaging applications as well as at least one chat application (e.g., a chat bot application) capable of providing documents and conversations with integrated contexts. In some examples, the messaging application may execute locally on a client computing device 104. In other examples, the messaging application (e.g., a mobile app on a thin client computing device 104B) may operate in communication (e.g., via network 106) with a corresponding server version of the messaging application executing on one or more server computing devices, e.g., Service Management Server 124 and/or Messaging Server 126. In still other aspects, rather than executing a client version of the messaging application, the one or more client computing devices 104 may remotely access, e.g., via a browser over network 106, the messaging application 110A implemented on the Service Management Server 124, Messaging Server 126 and/or multiple server computing devices (e.g., in a distributed computing environment such as a cloud computing environment).

As illustrated in FIG. 1, a client version of messaging application 110A is implemented by client computing device 104C. As should be appreciated, the client version of messaging application 110A may also be implemented in a distributed environment (e.g., cloud computing environment) across a plurality of server computing devices (not shown). Moreover, as should be appreciated, either a client or a server version of the messaging application 110A may be capable of sending, receiving, and providing emails with attachments to and from a document storage site. While a client version of the messaging application 110A and associated components 112-122 are shown and described, this should not be understood as limiting. Rather, a server version of messaging application 110A may similarly implement components 112-122 on a server computing device (e.g., Service Management Server 124, Messaging Server 126).

In a basic configuration, the one or more client computing devices 104 may be personal or handheld computers having both input elements and output elements operated by one or more users 102 (e.g., user 102A, user 102B, and user 102C). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing the messaging application 110A may be utilized.

In some aspects, network 106 is a computer network such as an enterprise intranet, an enterprise extranet and/or the Internet. In this regard, the network 106 may include a Local Area Network (LAN), a Wide Area Network (WAN), the Internet, wireless and wired transmission mediums. In further aspects, client computing device 104C may communicate with some components of the system via a local network (e.g., an enterprise intranet), whereas client computing device 104C may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the messaging application 110A may be implemented on a client computing device 104. In a basic configuration, the client computing device 104C may include at least a processing unit and a system memory for executing computer-readable instructions. Client computing device 104C may receive and render messages (e.g., emails, text messages, instant messages, etc.), which may include attached or embedded documents, graphics, hyperlinks, textual content, and data that specifies an access point to a chat service (e.g., such as a button, hyperlink, or other control). An access point as used herein enables the message recipient to launch a chat session directly from the message. Such messages, which may include documents and any associated content, attributes or properties, may be generated, stored, and/or distributed by Messaging Server 126. The Messaging Server 126 may be accessed by the one or more client computing devices 104 and one or more server computing devices (e.g., Service Management Server 124).

In aspects, Messaging Application 110A may comprise various components, including a Message Receiver 112, Access Point Detector 114, Context Data Extractor 116, Context Provider 118, Conversation Establisher 120, and Conversation Provider 122.

In aspects, Message Receiver 112 may receive messages from a sender, e.g., via Service Management Server 124. The message may contain an access point enabling the recipient to access other messaging applications, such as a chat service, directly from a message. In aspects described herein, the chat service may receive context from the messaging application such that a chat conversation may begin seamlessly at the point the email or other message left off. An access point may comprise a hyperlink, button or other control for launching the chat session from the message. In order to provide a continuous conversation experience to the user, information may be extracted from the message to provide context for a conversation with the chat bot. For instance, a message (e.g., an email) may deliver a monthly invoice as an attachment or as embedded content from a service provider (e.g., sender) to a customer (e.g., recipient). In addition to the invoice, the email may contain an access point that enables the customer to authenticate and access another messaging service, such as a chat service, associated with the service provider. In aspects, the messaging application 110A may pass customer credentials (for authenticating the recipient to the chat service) and/or context data from the message (for enabling a continuous conversation) via the access point to the chat service.

In some aspects, Access Point Detector 114 may detect selection of an access point embedded within a message. For instance, upon selection by the recipient, the embedded access point may enable the recipient (e.g., customer) to directly access a chat service associated with the message sender (e.g., service provider) to continue a conversation initiated by the message. For example, when Access Point Detector 114 detects selection of the access point, Access Point Detector 114 may communicate with other components of messaging application 110A, such as Context Data Extractor 116 (for extracting context data from the message) and/or Context Data Provider 118 (for providing context data to the chat service). In this way, by selecting the access point, the recipient may continue a conversation with a chat bot that was initiated in the message without requiring the recipient to search for and launch an online customer service website associated with a service provider (e.g., the service provider that sent the invoice above) and manually login and/or manually provide customer account number, invoice number, or other information contained in the message.

In some aspects, Context Data Extractor 116 may extract context data from the received message (e.g., email). The context data may comprise information extracted from the message that is sufficient to provide context for a conversation between a chat bot and the recipient of the email based on the content of the email between the sender (e.g., service provider) and the recipient. For instance, the extracted information may include identifiers associated with the sender and/or the recipient (e.g., a service provider contact name, a recipient account number, a recipient name, etc.), values or amounts (e.g., invoice amount, hours of service, units of product, etc.), attached documents (e.g., an invoice, a contract, etc.), subject matter of the message (e.g., subject line or other introduction), dates and times (e.g., invoice creation date, invoice due date), message content (e.g., "Past Due," increased service fees), and the like, between the sender and the recipient of the email. For example, if a message from a service provider (e.g., an email message, text message, or other message) delivers a monthly invoice to a recipient (e.g., a customer of the service provider), the extracted information may comprise a customer account number, a customer physical address, an invoice number, an invoice amount, a due date, and any content of the message. In this way, information extracted from the message may correspond to the subject matter of the conversation initiated in the message. In some cases, the context data may be embedded in or appended to the message as a metadata that is invisible to the recipient.

In some aspects, Context Data Provider 118 may provide the extracted context data to a third-party provider of an alternative conversation, such as a chat service. In aspects, the third-party provider may provide chat services on behalf of the sender of the message (e.g., the service provider). For instance, the Context Data Provider 118 may transmit the context data to Chat Server 128 over the Network 106; in some case, the Context Data Provider 118 may also provide access control information (e.g., user credentials) associated with the recipient for accessing the chat services provided by the Chat Server 128. In this way, the Context Data Provider 118 may enable the Chat Server 128 to start a chat conversation with the recipient (e.g., user 102C) that is a continuation of the message from the sender (e.g., service provider). In some aspects, rather than providing context to a third-party chat service, the Context Data Provider 118 may provide context to an in-house chat service hosted by the sender (e.g., a customer service division of the service provider). In either case, the context data passed to the chat service may enable a continuous conversation experience for the recipient starting from the conversation initiated in the message and continuing in the conversation with the chat service. As used herein, a "chat service" may include any instant messaging platform, either with an automated chat bot, with another user (e.g., chat personnel such as a customer service representative), or a combination of automated and human chat interactions.

In some aspects Conversation Establisher 120 may initiate a chat session and establish a new chat conversation based on the context data that was extracted from the message. For instance the messaging application 110A may communicate with the Chat Server 128 to provide access control data to authenticate the recipient to access the Chat Server 128 and/or the context data to start a chat conversation hosted by the Chat Server 128 based on the conversation initiated in the message. In some cases, rather than providing the access control data (e.g., user credentials), the user may be required to manually enter credentials in order to access the chat service and initiate a chat conversation. However, in either case, context data may be provided to the Chat Server 128 such that a continuous conversation experience between the message and the chat may be provided to the recipient.

In some aspects, Conversation Provider 122 may provide a virtual venue in which the chat conversation may take place. For instance, in response to Access Point Detector 114 detecting a selection of the access point, the messaging application 110A may provide an overlay window or an embedded window within or near the received message that creates a portal with the Chat Server 128 to start the chat conversation based on the same context of the message conversation. In other aspects, Conversation Establisher 120 may establish the chat session by launching an interface in a separate window in communication with the Chat Server 128 to start the chat conversation based on the same context of the message conversation.

As should be appreciated, FIG. 1 is described for purposes of illustrating the present methods and systems and are not intended to limit the disclosure to a particular sequence of steps or a particular combination of hardware or software components.

Figure 2:
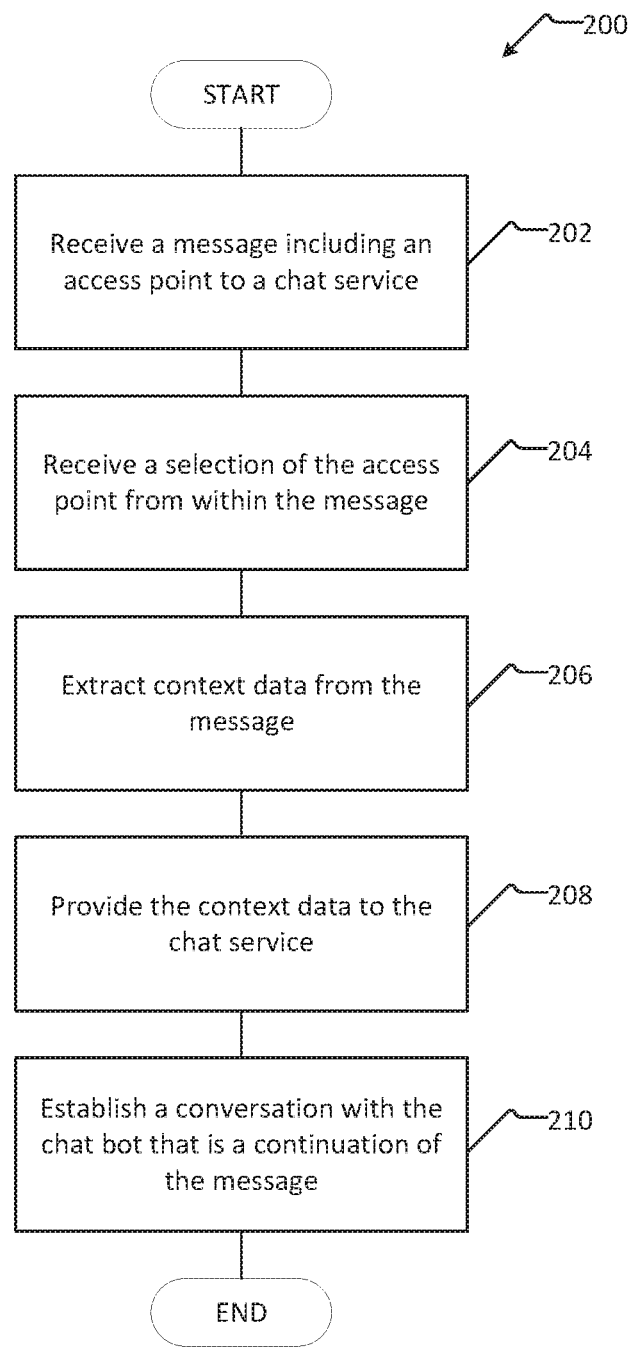
FIG. 2 illustrates a flowchart of operations for continuing a conversation from a received message to a chat service.

FIG. 2 illustrates a method of seamless transition from a message (e.g., email) to a chat service based on a chat-enabled message. Method 200 may comprise or be associated with one or more of messaging and/or chat service technologies, as described in FIG. 1.

At receive message operation 202, a message such as an email message or a text (SMS) message including an access point to a chat service may be received. The access point may comprise data to enable the message recipient to directly access the chat service to continue a conversation initiated in the message. For instance, in the case of a service provider (e.g., message sender) sending a monthly invoice to a customer via a message, the message may comprise an embedded access point to the chat service as well as context data, such as identifiers associated with the message sender (e.g., service provider) and/or the message recipient (e.g., customer), a date of the message, a subject of the message, attachments to the message (e.g., an invoice), values or amounts (e.g., invoice amount, product units, service fees, etc.), textual content (e.g., "Past Due," "increased service fee," "late fee," etc.), graphical content (e.g., a logo or other designator associated with the sender), embedded content (e.g., an embedded invoice), metadata appended to the message (e.g., timestamp, credential information, sender logging information, etc.), and the like. In some cases, the context data may further include credential information for authenticating the recipient to one or more of the messaging application and/or the sender. In some cases, the credential information may be provided to the chat service (which may be associated with the sender) for authenticating the recipient to the chat service.

At receive selection operation 204, an indication to select the access point from within the message may be received. For instance, the message recipient may click, hover over, or otherwise indicate a selection of a button, hyperlink, or other control to launch a chat session with the chat service via the access point. In aspects, the access point may enable the recipient to access the chat service directly from the message. In some aspects, the access point may be a button or other control displayed by the messaging application based on access point data (e.g., code) provided by the sender. The access point data may define a shape and a title of the button or control, as well as a link to the chat service, and the access point may be rendered by the messaging application based on the access point data within the email message.

At extract context data operation 206, context data may be extracted from the message. In some aspects, the context data may be embedded within or appended to the received message. The context data may comprise information is sufficient for an alternative messaging feature such as a chat service to start and carry on the conversation initiated in the message in a seamless manner. As described above, the context data may include identifiers associated with the message sender (e.g., service provider) and/or the message recipient (e.g., customer), a date of the message, a subject of the message, attachments to the message (e.g., an invoice), values or amounts (e.g., invoice amount, product units, service fees, etc.), textual content (e.g., "Past Due," "increased service fee," "late fee," etc.), graphical content (e.g., a logo or other designator associated with the sender), embedded content (e.g., an embedded invoice), metadata appended to the message (e.g., timestamp, credential information, sender logging information, etc.), and the like. Such context data may be extracted from the message via any suitable extraction technology either currently known or developed in the future.

At provide context data operation 208, the context data extracted from the message may be provided to a chat service associated with the sender of the message. In some cases, prior to providing the extracted context data, the messaging application may package the context data. A "package" may comprise an object or other wrapper for organizing the context data. For instance, the package may be an object comprising standard and customized fields for delivering the context data to the chat service. In aspects, standard fields may be associated with common context data, such as identifiers associated with the sender and/or recipient, a timestamp for the message, a subject line of the message, attachments to a message, body content of the message, etc. On the other hand, customizable fields may be specific to a message, and may include fields for particular values and units (e.g., pricing, product units, service units, etc.), recipient name or address, recipient account number, invoice number, etc. In this way, the messaging application may facilitate both extraction and communication of the context data according to a standardized format.

In aspects, by providing the context data to the chat service, the messaging application may facilitate a continuous conversation experience for the recipient. That is, by transmitting the context data to the chat service, the chat service may begin a chat conversation that continues a conversation initiated by the message. In this way, the recipient is not required to manually input context information after launching the chat session, i.e., the recipient may not be required to provide a customer name, customer account number, invoice number, customer address, etc., as the chat service has been provided with such context data by the messaging application. In some aspects, credential information for the recipient (e.g., customer) may also be transmitted with the context information, thus further eliminating manual login requirements to authenticate the recipient to and the chat service before continuing a conversation with the chat service that was initiated in the message. In other aspects, the recipient may be required to provide credential information to the chat service to continue the conversation. Based on the context data, the chat service (e.g., hosted by Chat Server 128) may communicate with the service provider (e.g., hosted by Service Management Server 124) to authenticate the recipient and continue a conversation initiated in the message sent by the service provider.

At establish conversation operation 210, a chat session may be established via the access point with a chat service. In aspects, establishing the chat session may involve launching a window within or near the message to establish a conversation with the chat service. For instance, the conversation may be established with a chat bot or as a chat with another user (e.g., a customer service representative for the service provider). In further aspects, the conversation may carry over (or continue) the existing conversation with the chat service that was initiated by the received message. As the context data for the email-based (e.g., existing) conversation was provided by the messaging application to the chat service, the chat service is able to begin the chat conversation from the point that the email conversation left off, thus providing a continuous conversation experience to the user.

As should be appreciated, operations 202-210 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3A:
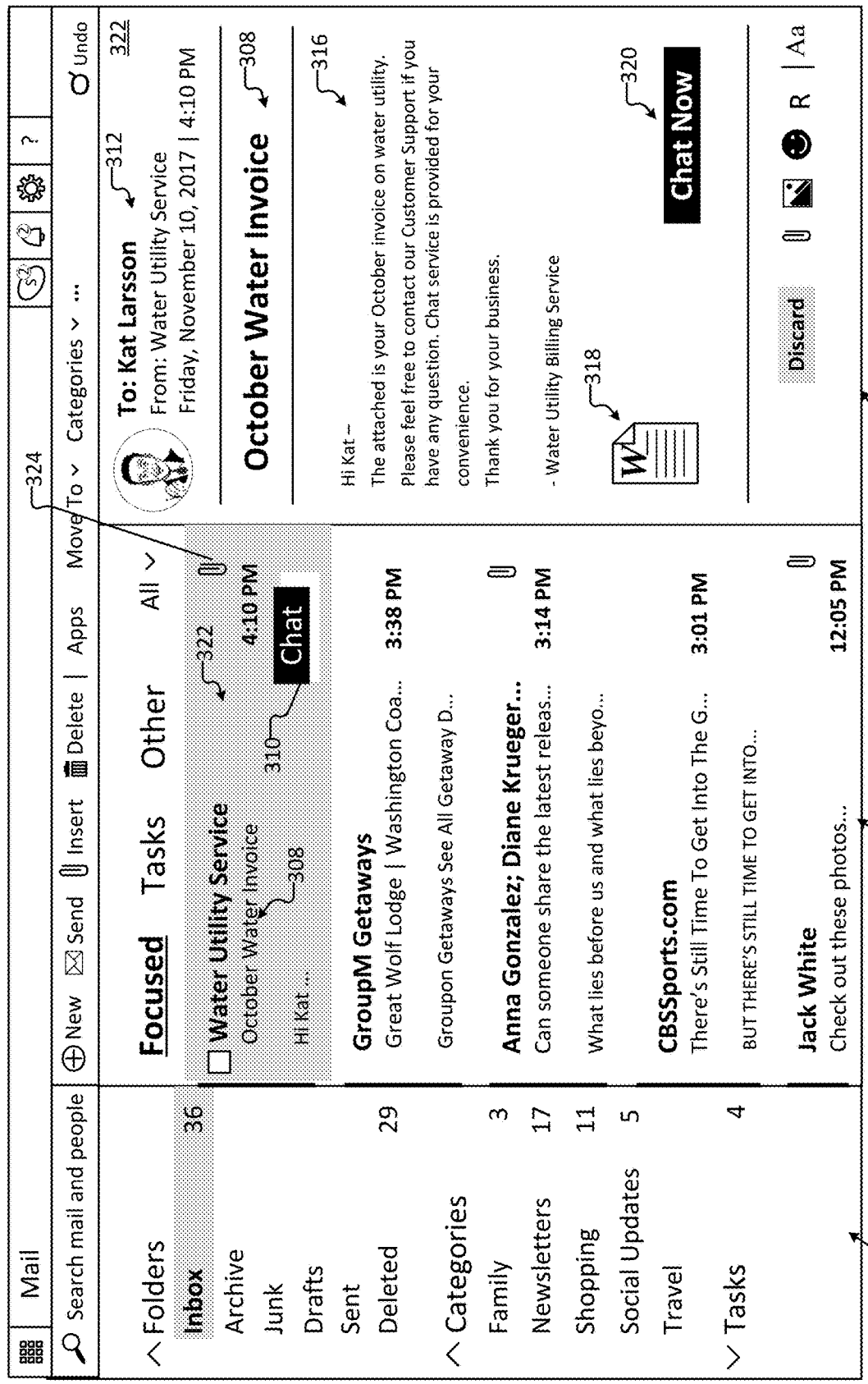
FIGS. 3A and 3B illustrate examples of a graphical user interface (GUI) according to an example system.

FIG. 3A illustrates a graphical user interface (GUI) 300A of an email application according to an example. GUI 300A may include a navigation pane 302, a list pane 304, and a content pane 306. The navigation pane 302 may list folders, as well as categories and tasks, where messages may be organized according to categories and tasks, respectively. The navigation pane 302 may show an indicator (e.g., highlighting or shading) to signify a selection of a folder, category or task (e.g., as illustrated, the Inbox folder). In this case, when the Inbox folder has been selected, list pane 304 shows a list of messages (e.g., emails) provided in the Inbox. In the list pane 304, an email 322 from Water Utility Service with a subject line "October Water Invoice" 308 may be selected (as indicated by shading). The email 322 was received at 4:10 PM, and the list pane 304 may display partial content of the email 322. In addition, a chat button 310 (e.g., access point) may be displayed within the partial display of the email 322. In aspects, a recipient of the email 322 may select the chat button 310 from the partial content of email 322 (in list pane 304) or may select a chat now button 320 from within full content of email 322 (in the content pane 306). In other aspects, an access point to the chat service may be provided with the same graphical features (e.g., name, size, and shape) in both the list pane 304 and the content pane 306 (i.e., panes 304 and 306 may both display a chat button 310 or a chat now button 320).

The messaging application may receive selection of the chat button 310 via a user interaction, e.g., a click, touch or hover selection, to transition from the GUI 300A of the messaging application to a user interface associated with a chat service.

When email 322 has been selected (as illustrated by shading) in the list pane 304, the content pane 306 may display the full content of email 322. For instance, the content pane 306 may display the email 322 from Water Utility Service with a subject line "October Water Invoice" 308. Additionally, email header section 312 may display a sender and a receiver of the email 322, as well as a date and time that the email 322 was sent. As provided in both the list pane 304 and the content pane 306, the subject line is "October Water Invoice" 308. Message body 316 may display message content of the email 322. For instance, the email 322 may deliver an October invoice for water utility services to Kat Larsson (recipient), a customer of the Water Utility Service (service provider; sender). The message may also invite the customer to use a chat service (e.g., via chat now button 320) to chat with a customer service representative at the Water Utility Service consumer department (and/or with a third-party chat service associated with the Water Utility Service) about the October invoice. As illustrated, the October invoice is provided as an email attachment indicated by a document icon 318 in the content pane 306 (and indicated by a paper clip icon 324 in the list pane 304). In other aspects, the October invoice may be provided as a hyperlink, an embedded object in the message body 316, or otherwise.

Upon receiving a selection of the Chat button 310 or the Chat Now button 320, a session with a chat service may be provided to the user. As detailed above, the chat service may be hosted by the Water Utility Service (e.g., to provide online customer service via chat) or may be hosted by a third-party chat service (e.g., that provides an automated chat bot). In aspects, the third-party chat service may be contracted by or otherwise associated with the Water Utility Service. Using the chat service, the user may inquire about the October invoice, as well as any other topic that pertains to the water utility service provider.

Figure 3B:
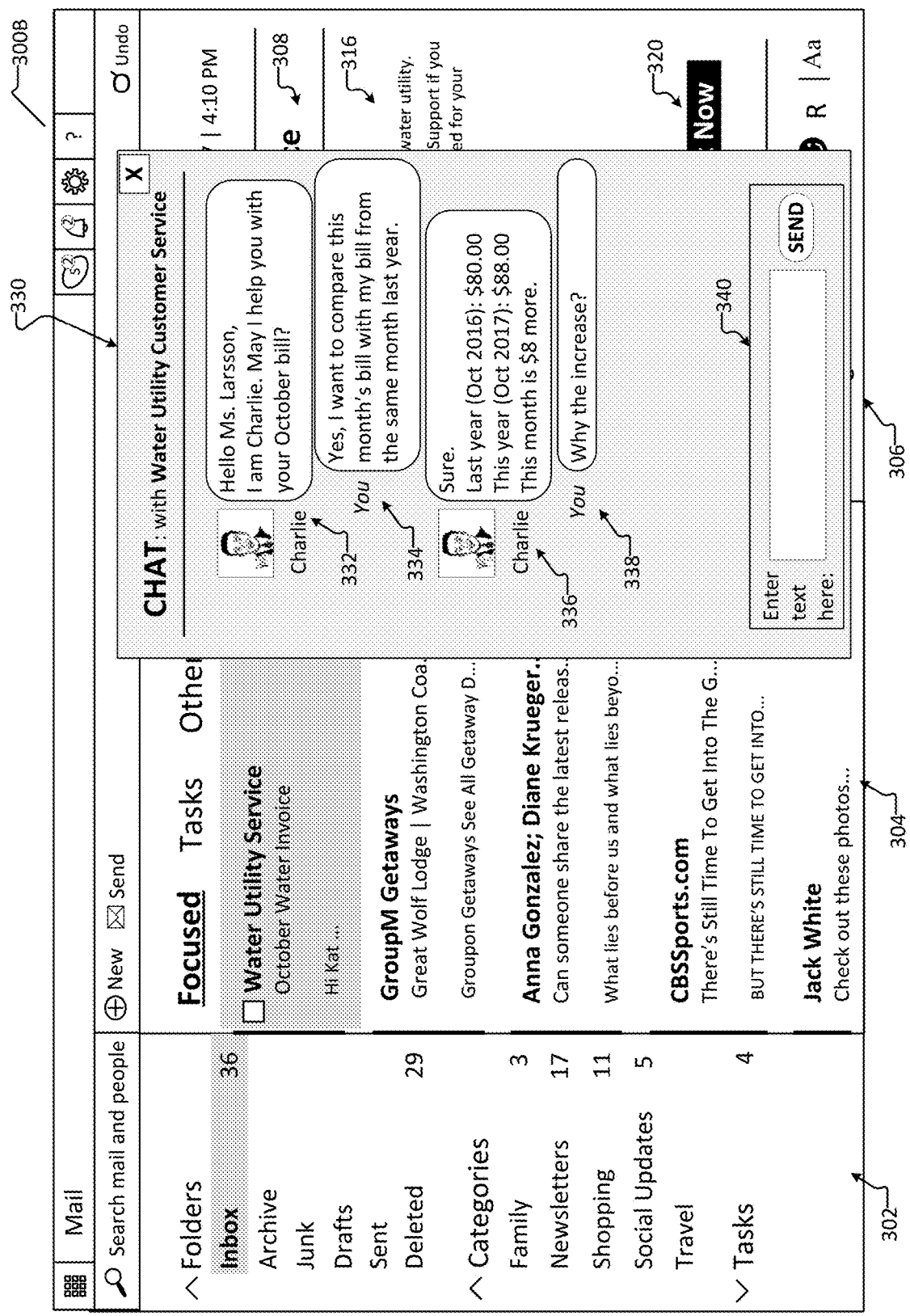

FIG. 3B illustrates a graphical user interface (GUI) 300B displaying an email application with a chat session according to an example system. GUI 300B shows a chat window 330, which may overlay the GUI 300A of the email application. Although shown as an overlay, chat window 330 may be provided as an embedded window or other user interface by the email application. Alternatively, upon receiving a selection of chat button 310 or chat now button 320, an external interface associated with the chat service may be launched. As illustrated, the chat window 330 is displayed as an overlay in response to GUI 300A receiving a selection of the chat button 310 (illustrated in FIG. 3A) or the chat now button 320. In aspects, the transition from the conversation initiated in email 322 to the chat conversation within chat window 330 may be processed seamlessly, that is, without requiring the user (recipient Kat Larsson) to manually input context information to the chat service. Unlike traditional systems that require the user to manually specify context (e.g., customer account number, invoice number, customer name, etc.) and/or user credentials for the chat, the email application automatically extracts context information from the email 322 and relays the context to the chat service. In this way, a continuous conversation experience in which the chat conversation begins where the email conversation left off may be provided to the user.

For example, the chat window 330 may display a name of the customer service representative (or a pseudo name for a chat bot) that the user is conversing with, such as Water Utility Service Representative, Charlie. As illustrated, the first chat 332 from Charlie may indicate and confirm the context of the chat session: "May I help you with your October bill?" The customer (e.g., "You") may acknowledge that the conversation relates to the October invoice, and may request a comparison to a previous month, such as a comparison between the invoiced amount for the same month in a previous year and the current year. Charlie may respond with acknowledgement of the request and the requested comparison information. In the example, Charlie responds with $80.00 and $88.00 as invoice amounts from October 2016 and October 2017, respectively, as well as a net increased amount of $8.00 for 2017. The user may then respond with a question directed to the reason for the net increase. In some aspects, a text input area 340 may be provided within the chat window 330 for receiving text input from the user.

In some aspects, the transition from the conversation initiated by email 322 to the chat conversation within chat window 330 may be processed without the user being required to manually enter context information and/or user credentials for the chat session. For instance, context information may be extracted from the email 322 by the email application and automatically transmitted to the chat service. The transmission to the chat service may be invisible to the user and may not require any user interaction other than selection of an access point (e.g., chat button 310 or chat now button 320). In some cases, the email application may also provide user credentials in the transmission to the chat service. For example, the email application may authenticate the user to the chat service based on user credentials associated with the user's email account, which was accessed by the user to receive the email 322. The email application may extract the context information from the email 322 (and/or user credentials associated with the user email account) and may provide such information to a chat server in response to receiving a user indication to begin a chat conversation.

In some aspects, the chat service may be provided by a third-party chat service, where the third-party chat service hosts automated chat bots that receive and analyze chat messages from a user. In aspects, a chat bot may analyze chat messages based on natural language processing or any other processing technology that is currently known or developed in the future. The chat bot may also generate and send chat messages to the user based on analyzing the messages from the customer. For instance, the chat bot may utilize the context information received from the email application by the chat server. In further aspects, the chat server may communicate with a server associated with a service provider, such as a customer management server at the Water Utility Service, to request and receive information regarding an inquiring customer, such as historical billing information, statistical billing information for other users (e.g., neighbors), service fees, unit pricing, service packages, technical support, etc. In this way, the user (e.g., customer) may have a continuous conversation experience between a conversation initiated in a first message type (e.g., email message, text message, etc.) and the conversation continued in a second message type (e.g., a text message, instant message, chat message, etc.).

As should be appreciated, FIGS. 3A and 3B are described for purposes of illustrating the present methods and systems and are not intended to limit the disclosure to a particular sequence of steps or a particular combination of hardware or software components.

FIG. 4 provides an example of email data 400, which includes information about the email header, the message content, attachments, as well as user credentials for an email account. In aspects, such information may be extract by the email application and provided to a chat service such that a user may seamlessly transition a conversation from an email message to a chat session. In aspects, email data 400 may comprise a header section 402 and multi-part content section, including a main message part 404 and a context part 406. The email header section 402 may contain basic information about the email, such as names and email addresses of a sender and a receiver of the email message, a date of the email ("Fri, 10 Nov. 2017 22:10:00-0600"), Subject ("October Water Invoice"), with delimiters such as a text string "----- accesschatbot" for separating parts of email data 400. In the example, the email comprises two content parts. The main message part 404 is of data type "text/plain," which contains message text that is displayed in the message body 316 in FIG. 3A.

The context part 406 may be expressed as a content type "application/withchatbot" to describe a context of the email. In aspects, the context part 406 may include information such as a Customer ID ("123456789"), a type of service provided ("Water"), an address of a chat bot portal server for establishing a chat session (examplebot@water.util.example), an identifier of the chat bot ("The-Water-Utility-Customer-Support"), an authentication code for the customer to access the chat bot with the user credential (#ChatBotAuthenticationCode), the current month ("10/2017"), a token ID to specify a topic of the chat expected ("86817613"), and option setting at the email application such as whether to render a chat button ("ShowButtonToStartSEssion=TRUE") within the email. In some aspects, the email application may extract data from the context part 406 of the email data 400, and may transmit the data to connect, authenticate, and establish a new chat session based on the context specified in the email data 400.

The chat server, which may be contacted for establishing the chat session in response to receiving selection of an access point by the email application, may connect to a server associated with a service provider, such as a water utility service provider, and may authenticate the user based on user credentials for an email account and/or based on the context part 406 of the email data 400 received from the service provider in the email message. Alternatively, the chat server may authenticate the user to the server of the service provider in response to receiving manual credentials from the user. Based on authentication of the user, the chat server may request and receive customer information and/or generalized information (such as pricing, service packages, standard service fees, etc.) from the service provider (e.g., the Water Utility Service). Based on context information received from the email application, the chat server may establish a chat session with the user that relies on context-specific information, such as customer or account identity, customer and water utility service information, customer invoices, customer invoice and payment history, etc. In this way, the chat service is able to continue a conversation initiated in an email message to provide a seamless customer experience. In particular, the chat service may receive context and/or customer credentials from the email application, may analyze the context information to formulate a chat message to the user based on the previous email message, may receive and analyze subsequent chat messages from the customer, may request and receive data from the water service provider as needed, and may provide the user with an efficient and insightful chat session.

FIG. 4 illustrates an example of user credential and context data provided by email data 400 such that an email application is able to extract the user credential and/or context data from the email data 400 for transmission to a chat service, without limiting the scope of implementation. User credentials and context data may also comprise a set of identifiers and token IDs that the email application or the chat server may use to retrieve complete information. In aspects, user credentials and context data may be embedded in parts and sections other than under the scheme of multipart email data 400. In aspects, user credential and context data may be encrypted by the sender of the email (e.g., an email server, a server associated with a service provider, or otherwise) to securely transmit the information via an email. In some cases, the encrypted user credentials and/or context data may be extracted and transmitted to a chat service in an encrypted form.

As should be appreciated, FIG. 4 is described for purposes of illustrating the present methods and systems and is not intended to limit the disclosure to a particular sequence of steps or a particular combination of hardware or software components.

Figure 5:
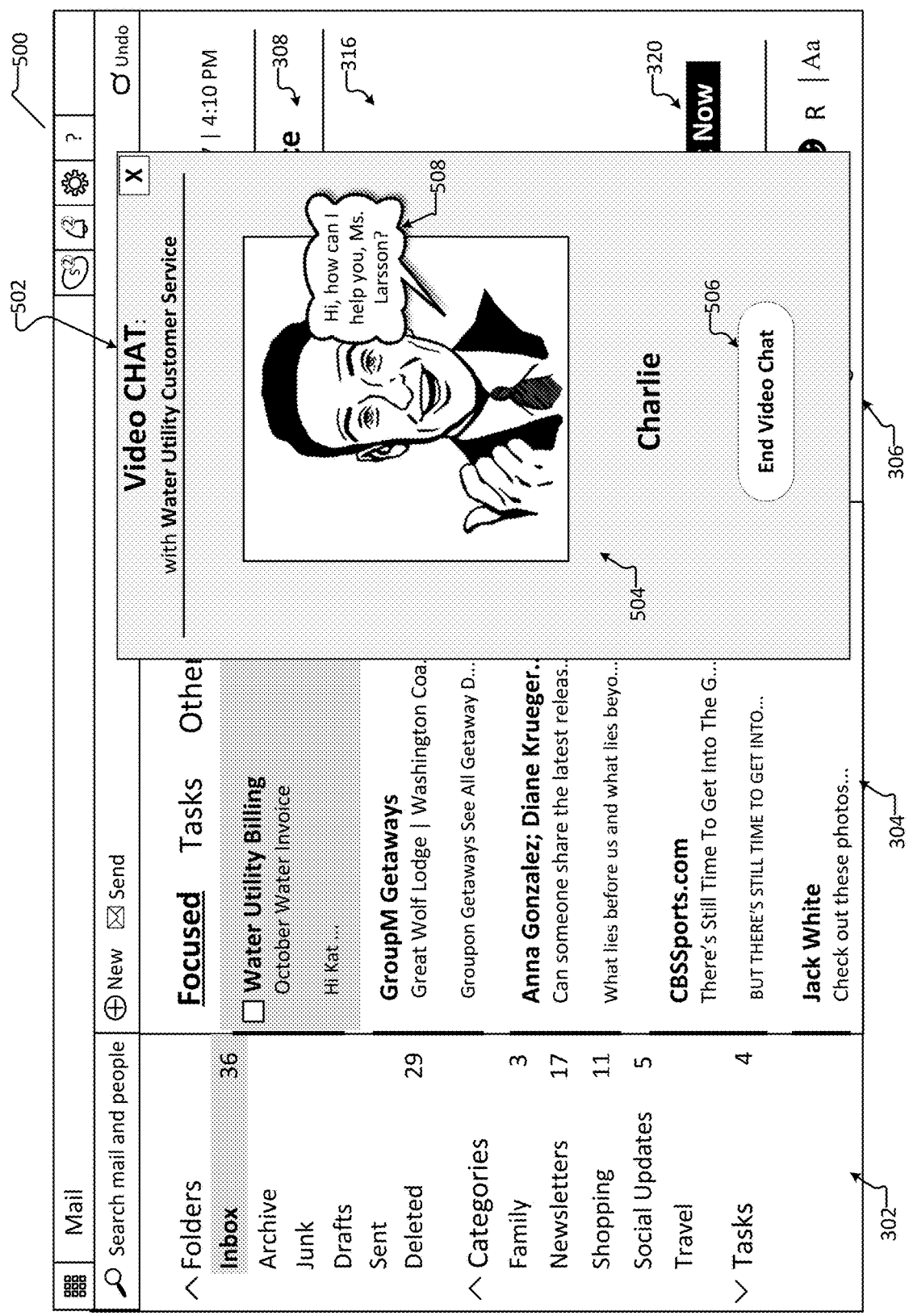
FIG. 5 illustrates a graphical user interface (GUI) for a video chat according to an example system.

FIG. 5 illustrates a message application, such as an email application, configured to provide a video chat feature. In this case, rather than a textual chat session, a video chat session may be established with a chat service in response to receiving selection of an access point (e.g., chat button 310 or chat now button 320). Similar to the examples provided above, a video chat session may also transition seamlessly from a conversation initiated in a message (e.g., an email message) to a conversation hosted by a video chat service, according to an example system. A video chat interface 502 may be displayed as an overlay window in response to a message recipient selecting an access point within a message (e.g., chat now button 320). In aspects, a messaging application may extract context information from the received message, and may use the context information to connect and establish a video chat session with a chat service.

In this example, video chat overlay window 502 provides a video portal 504 showing Charlie, a customer support representative (or a digitally rendered avatar for a chat bot), for conversing with the message recipient (e.g., customer). In aspects, based on context information transmitted from the messaging application, Charlie may already be informed regarding the subject matter of the video chat session, such as but not limited to, context information such as a name of the user (e.g., Ms. Larsson), an account number, invoice number, customer address, etc. For example, the video chat may begin with Charlie addressing the customer, "Hi, how can I help you, Ms. Larsson?" In this way, the video chat session continues a conversation with the email recipient (e.g., Kat Larsson) without the email recipient being required to manually provide context to the chat service (such as, customer name, account number, invoice number, etc.). In aspects, the customer may select an "End Video Chat" button 506 when the customer would like to end the video chat with Charlie. Use of video chat rather than text or chat messaging may be more effective in communicating nuances between the customer support representative (or the chat bot) to understand and react to situations that customers would like resolved. In the case of a video chat with a chat bot, verbal messages from the user may be converted to text (e.g., via speech-to-text technologies) for analysis and processing by the chat bot; additionally, chat messages generated by the chat bot may be converted to speech (e.g., via text-to-speech technologies) when delivered to the user in the video chat (e.g., via an avatar).

As should be appreciated, FIG. 5 is described for purposes of illustrating the present methods and systems and is not intended to limit the disclosure to a particular sequence of steps or a particular combination of hardware or software components.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
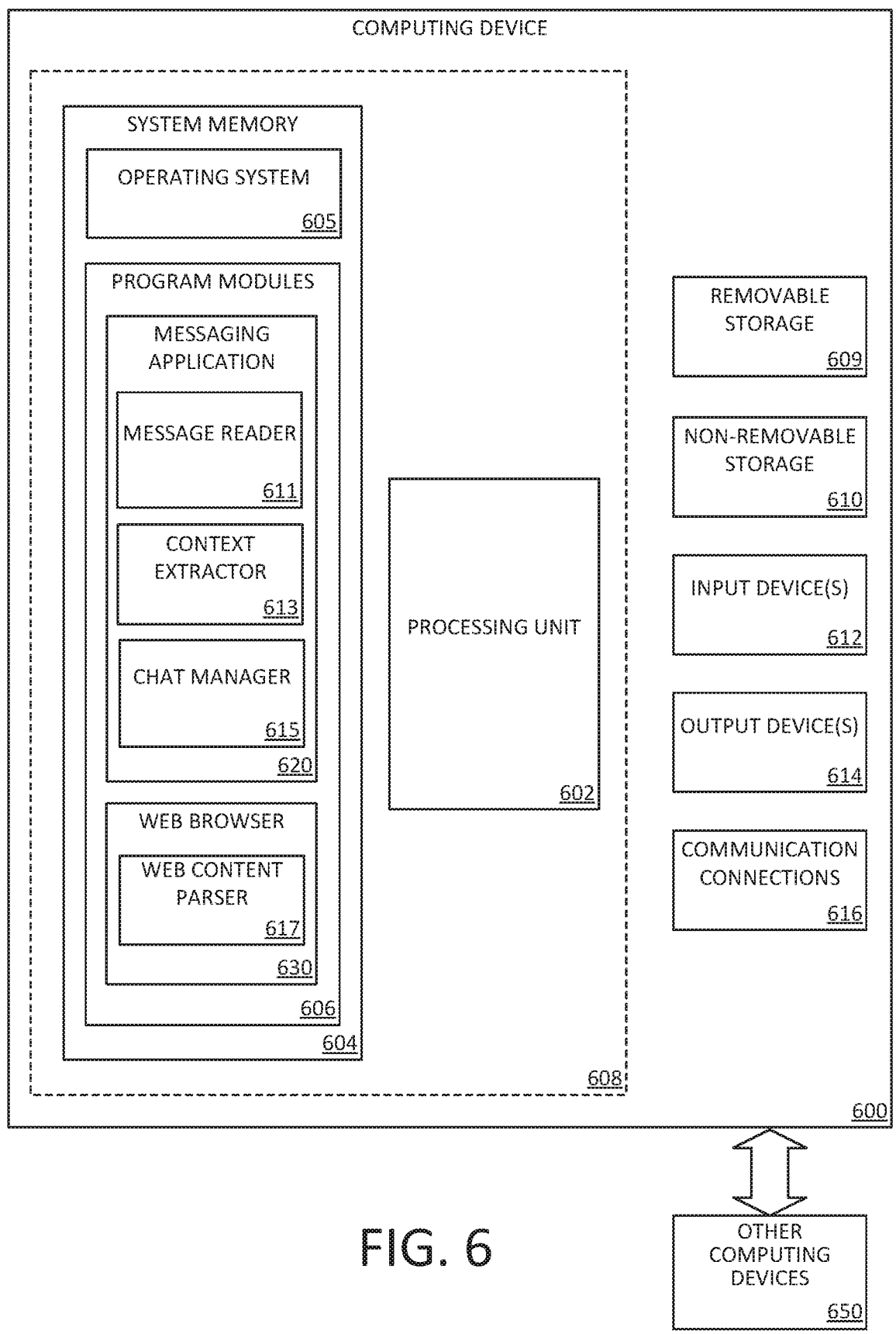
FIG. 6 illustrates a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing a messaging application 620 on a computing device, including computer executable instructions for a messaging application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for performing the various aspects disclosed herein. For example, the one or more program modules 606 may include a messaging application 620 for managing display of one or more graphical user interface objects and user interactions.

As illustrated by FIG. 6, a messaging application 620 may include one or more components, including a message reader 611 for receiving and displaying email lists and messages, a context extractor 613 for extracting user credentials and context information from the message data, in order to seamlessly transition from messages to a chat session, and a chat manager 615 for managing presentation of chat sessions through graphical user interface. As illustrated by FIG. 6, a messaging application 620 may have access to Web Browser 630, which may include or be associated with a web content parser to render and control messaging contents on the web browser. In further examples, the one or more components described with reference to FIG. 6 may be combined on a single computing device 600 or multiple computing devices 600.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., a messaging application 620) may perform processes including, but not limited to, the aspects, as described herein. Other program modules that may be used in accordance with aspects of the present disclosure, and in particular for managing display of graphical user interface objects, may include a message receiver 611, context extractor 613, chat manager 615, web browser 630, and/or web content parser 617, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As should be appreciated, FIG. 6 is described for purposes of illustrating the present methods and systems and are not intended to limit the disclosure to a particular sequence of steps or a particular combination of hardware or software components.

Figure 7A:
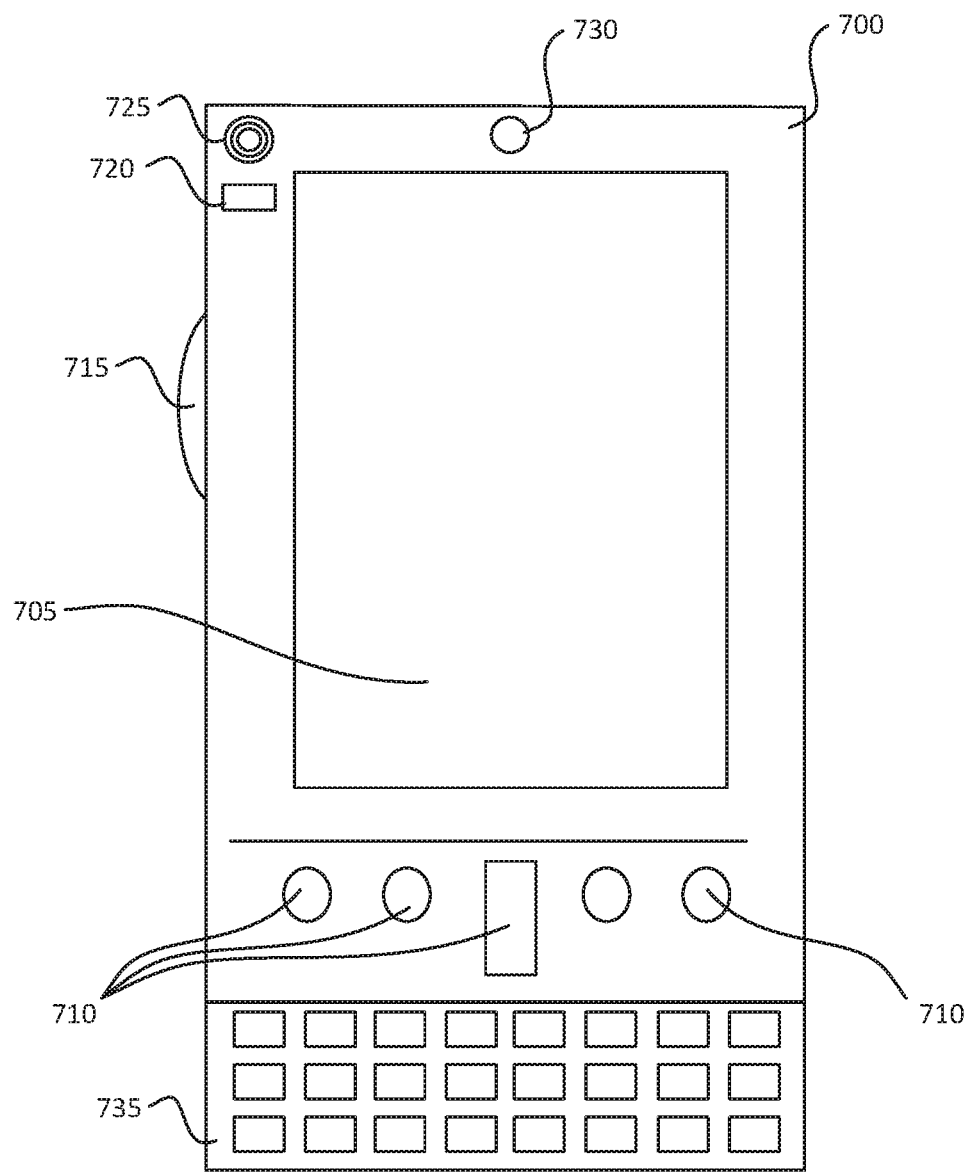
FIGS. 7A and 7B are simplified block diagrams of a mobile computing device with which aspects of the present disclosure may be practiced.
Figure 7B:
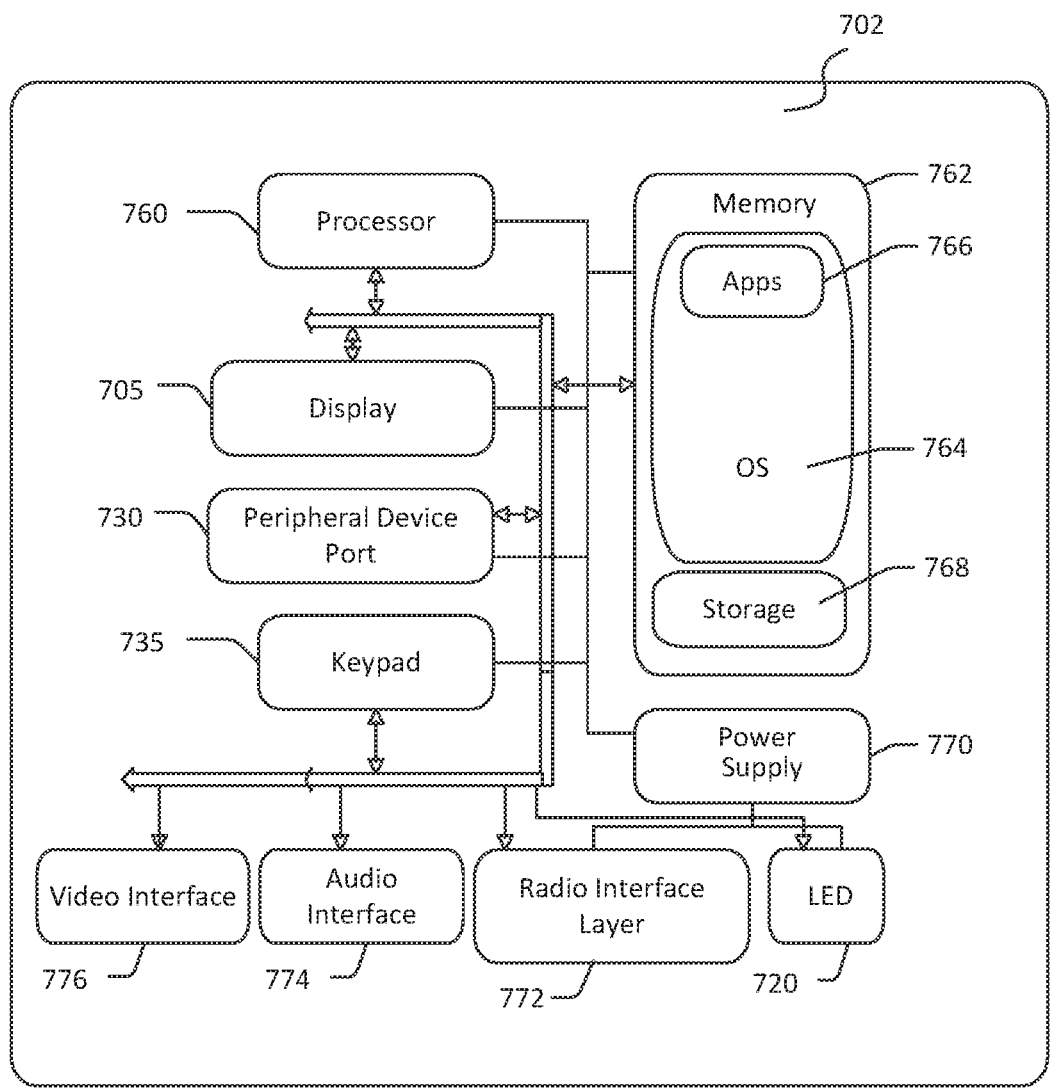

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing a consensus determination application as described herein (e.g., message parser, suggestion interpreter, opinion interpreter, and/or consensus presenter, etc.).

The system 702 has a power supply 770, which may be implemented as one or more batteries. The power supply 770 may further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device port 730 (e.g., on-board camera) to record still images, video stream, and the like. Audio interface 774, video interface 776, and keypad 735 may be operated to generate one or more messages as described herein.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIGS. 7A and 7B are described for purposes of illustrating the present methods and systems and are not intended to limit the disclosure to a particular sequence of steps or a particular combination of hardware or software components.

Figure 8:
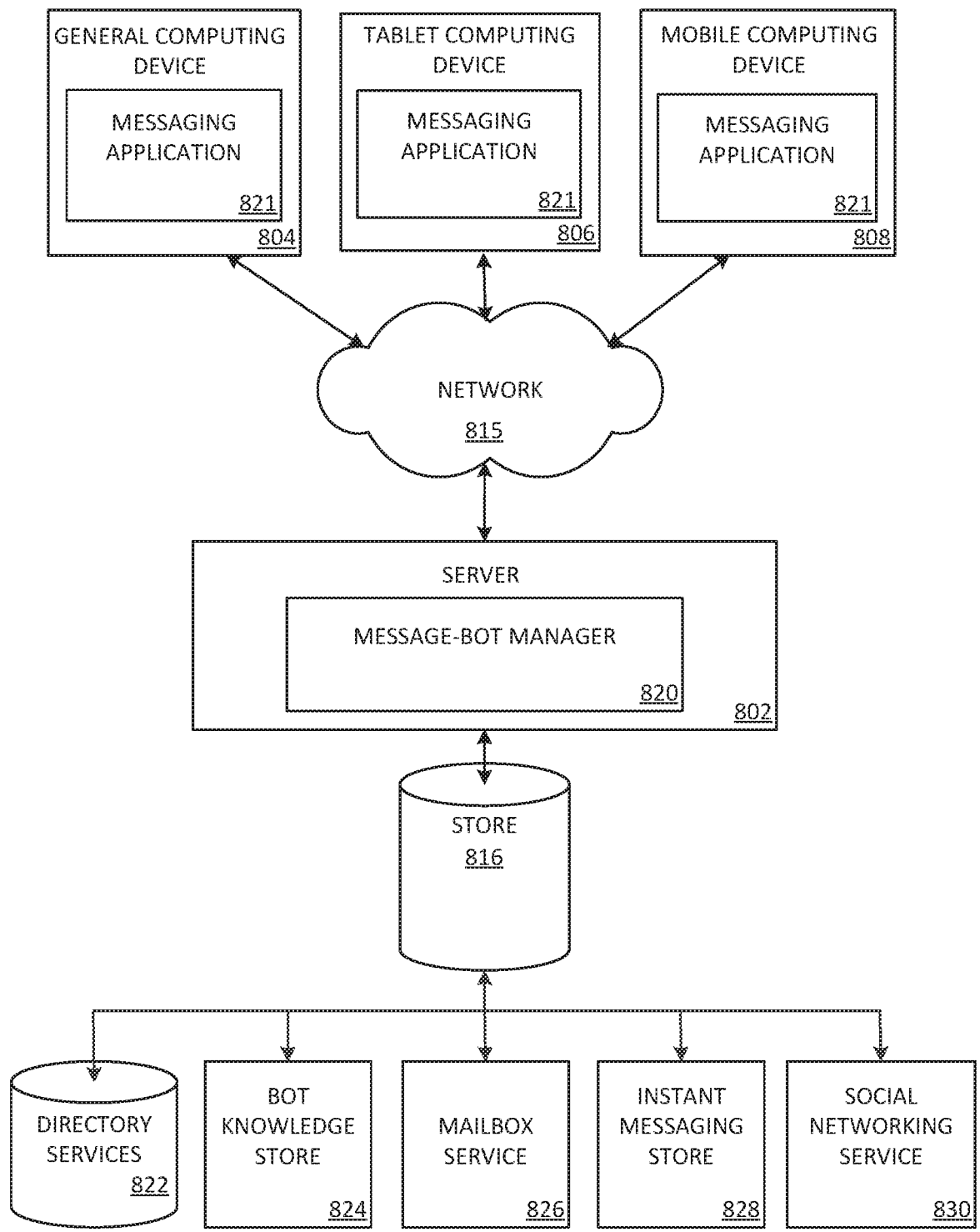
FIG. 8 is a simplified block diagram of a distributed computing system in which aspects of the present disclosure may be practiced.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various messages may be received and/or stored using directory services 822, a bot knowledge store 824, a mailbox service 826, an instant messaging store 828, or a social networking service 830. A messaging application 821 may be employed by a client that communicates with server device 802, and/or the message-bot manager 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above with respect to FIGS. 1-5 may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
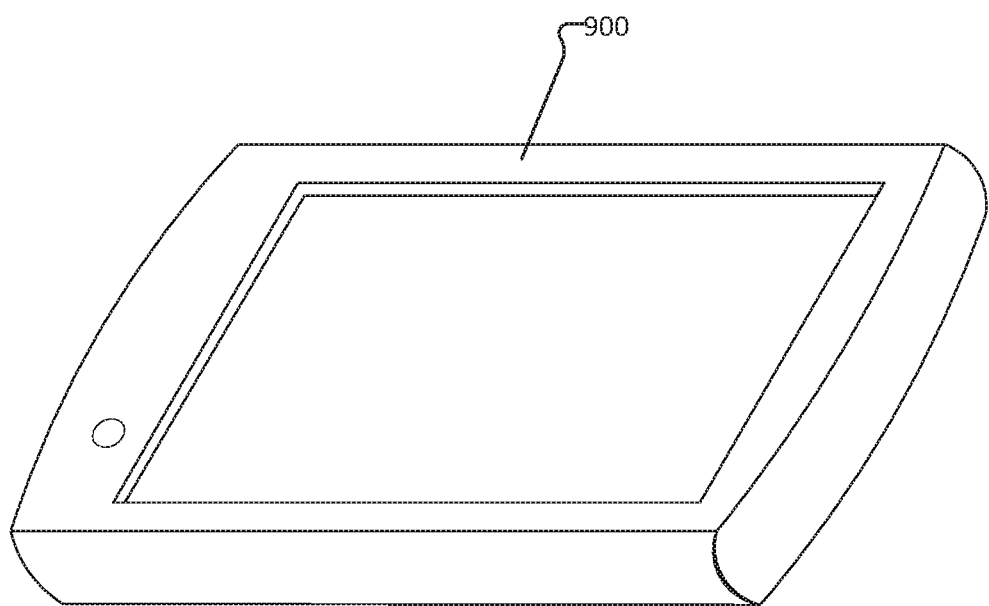
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for launching a chat session from a message, the method comprising:
   receiving, at a messaging service, a message including an access point to a chat service, wherein the access point comprises credentials for accessing the chat service and the access point is a button, hyperlink, or control;
   receiving, into a first window of the messaging service, a selection of the access point from within the message;
   extracting context data from the message;
   providing the context data to the chat service; and
   establishing a conversation with the chat service according to the selected access point from within the message and based on the context data, wherein the conversation with the chat service is a continuation of the message based on the context data, and wherein the conversation is presented in a second window of the messaging service that is concurrently displayed with at least a portion of the first window.

2. The computer-implemented method of claim 1, wherein the context data comprises one or more of:
   credential information;
   content of the message;
   an identifier associated with a sender of the message;
   an identifier associated with a recipient of the message;
   an attachment of the message;
   a name of the recipient; and
   metadata associated with the message.

3. The computer-implemented method of claim 1, further comprising:
   packaging at least a portion of the context data into a package; and
   providing code instructions for executing the context data from the package at the chat service.

4. The computer-implemented method of claim 1, wherein the chat service provides the conversation with one of: an automated chat bot and another user.

5. The computer-implemented method of claim 4, wherein the another user comprises a customer service representative.

6. The computer-implemented method of claim 1, further comprising:
   authenticating a recipient of the message to the chat service based on the selection of the access point from within the message, wherein the message comprises multi-part data including the access point.

7. The computer-implemented method of claim 6, wherein authenticating the recipient of the message to the chat service comprises providing credential information for the recipient to the chat service based on the access point within the message.

8. The computer-implemented method of claim 1, wherein the chat service is a third-party service providing chat services on behalf of a sender of the message.

9. The computer-implemented method of claim 1, wherein the message is one of an email message and a text message.

10. A computer system, comprising:
    at least one processing unit; and
    at least one memory storing computer-executable instructions for launching a chat session from a message that when executed by the at least one processing unit cause the computer system to:
    receive, at a messaging service, a message including an access point to a chat service, wherein the access point comprises credentials for accessing the chat service and the access point is a button, hyperlink, or control;
    receive, into a first window of the messaging service, a selection of the access point from within the message;
    extract context data from the message;
    provide the context data to the chat service; and
    establish a conversation with the chat service according to the selected access point from within the message and based on the context data, wherein the conversation with the chat service is a continuation of the message based on the context data, and wherein the conversation is presented in a second window of the messaging service that is concurrently displayed with at least a portion of the first window.

11. The computer system of claim 10, wherein the context data comprises one or more of:
    credential information;
    content of the message;
    an identifier associated with a sender of the message;

an identifier associated with a recipient of the message;
an attachment of the message;
a name of the recipient; and
metadata associated with the message.

12. The computer system of claim 10, wherein the computer-executable instructions further cause the computer system to:
package at least a portion of the context data; and
provide code instructions for executing the context data from the package at the chat service.

13. The computer system of claim 10, wherein the chat service provides the conversation with one of: an automated chat bot and another user.

14. The computer system of claim 10, wherein the computer-executable instructions further cause the computer system to:
authenticate a recipient of the message to the chat service based on the selection of the access point from within the message, wherein the message comprises multi-part email data including the access point.

15. The computer system of claim 14, wherein authenticating the recipient of the message to the chat service comprises providing credential information for the recipient to the chat service.

16. The computer system of claim 10, wherein the chat service is a third-party service providing chat services on behalf of a sender of the message.

17. The computer system of claim 10, wherein the message is one of an email message and a text message.

18. A computer-readable storage device storing computer-executable instructions for launching a chat session from a message that when executed by at least one processing unit cause the processing unit to:
receive, at a messaging service, a message including an access point to a chat service, wherein the access point comprises credentials for accessing the chat service and the access point is a button, hyperlink, or control;
receive, into a first window of the messaging service, a selection of the access point from within the message;
extract context data from the message;
provide the context data to the chat service; and
establish a conversation with the chat service according to the selected access point from within the message and based on the context data, wherein the conversation with the chat service is a continuation of the message based on the context data, and wherein the conversation is presented in a second window of the messaging service that is concurrently displayed with at least a portion of the first window.

19. The computer-readable storage device of claim 18, wherein the chat service provides the conversation with one of: an automated chat bot and another user.

20. The computer-implemented method of claim 1, wherein the context data comprises a subject extracted from a subject area of the message, and wherein a subject of the conversation is based on a subject of the message.

* * * * *